United States Patent [19]

Waehner

[11] Patent Number: 4,628,362
[45] Date of Patent: Dec. 9, 1986

[54] COMBINED VIDEO AGC AND DIGITIZING CIRCUIT

[75] Inventor: Glenn C. Waehner, New Canaan, Conn.

[73] Assignee: American Dynamics Corporation, Orangeburg, N.Y.

[21] Appl. No.: 729,813

[22] Filed: May 2, 1985

[51] Int. Cl.⁴ .................. H04N 5/53; H04N 5/52; H04N 5/57

[52] U.S. Cl. .................. 358/174; 358/168; 358/169

[58] Field of Search ............. 358/153, 154, 158, 174, 358/176, 181, 168, 169, 161, 32, 179

[56] References Cited

U.S. PATENT DOCUMENTS

| | | | |
|---|---|---|---|
| 3,257,506 | 6/1966 | Siepmann | 358/169 |
| 3,909,521 | 9/1975 | Hunt et al. | 358/168 |
| 4,318,129 | 3/1982 | Zwirn | 358/174 |
| 4,363,976 | 12/1982 | Minor | 307/351 |
| 4,402,087 | 8/1983 | Sakamoto et al. | 382/53 |
| 4,434,439 | 2/1984 | Steckler et al. | 358/179 |
| 4,517,586 | 5/1985 | Balaban et al. | 358/13 |
| 4,523,232 | 6/1985 | Kameda et al. | 358/169 |
| 4,525,741 | 6/1985 | Chahal et al. | 358/174 |
| 4,540,974 | 9/1985 | Schanne et al. | 358/13 |

FOREIGN PATENT DOCUMENTS

| | | | |
|---|---|---|---|
| 0022488 | 2/1984 | Japan | 358/174 |
| 0684781 | 9/1979 | U.S.S.R. | 358/168 |

Primary Examiner—John W. Shepperd
Assistant Examiner—Cynthia Smith
Attorney, Agent, or Firm—Michaelson & Einschlag

[57] ABSTRACT

An automatic gain control (AGC) and digitizing circuit, particularly suitable for use in digital video image processing and/or display systems, is disclosed. This circuit advantageously defines an active window within an image area and operates the AGC only on the active window in order to ensure that the active window is always displayed, on a remote monitor, with proper brightness and contrast. The active window can be located anywhere within the image area and can be set to encompass an area extending from only a single picture element to the entire image area.

16 Claims, 2 Drawing Figures

COMBINED VIDEO AGC AND DIGITIZING CIRCUIT

BACKGROUND OF THE INVENTION

1. Field of the Invention

The invention relates to an automatic gain control (AGC) and digitizing circuit particularly suitable for use in digital video image processing and/or display systems.

2. Description of the Prior Art

A video camera is used to produce an electrical representation of an image for many uses, one of which is to provide a video image on a remote monitor in security applications. In some of these applications, a camera is placed at a particular location and scans a particular scene frequently over an extended period of time. Unfortunately, background light which forms part of this scene frequently changes over this period. In order to produce a video image on the remote monitor having proper brightness and contrast, the video signal produced by the camera must be constantly adjusted whenever the background light changes. This requires that the gain and DC level of the video signal change in response to changes in the intensity of the background light; otherwise, the remotely displayed image will either be too light or too dark and hence difficult to perceive.

A video signal is comprised of negative going horizontal and vertical synchronization pulses (hereinafter collectively referred to as the "synch" pulses) having a maximum peak amplitude of −0.4 volts which sandwich analog video (picture) information that varies between +1.0 volt, for a pure white signal, to 0.0 volts or ground, for a true black signal.

One well-known method to ensure that a video signal is maintained at an appropriate level is to connect an automatic gain control (AGC) circuit to the output of the camera. This circuit, fed by the video signal produced by the camera, responds to any changes in the video signal caused by changes in the intensity of the light comprising the scene and then adjusts the video signal accordingly.

Furthermore, in video applications which use digital processing techniques, the video signal produced by a camera is digitized by a suitable analog-to-digital (A/D) converter prior to subsequent image processing and/or display. In these applications, an AGC is essential in order to ensure that the picture information consumes the entire dynamic range of the A/D converter.

Several different video AGC circuits appear in the art. However, all of these circuits disadvantageously possess various drawbacks. For example, one such circuit which sees very common use in the art is the so-called "DC restorer". In theory, this circuit operates under the assumption that the gain of the video signal is correct. This circuit then determines the voltage corresponding to the blackest area in the video image and adjusts the video level to ensure that this voltage level lies within a proper range. However, in practice, this type of circuit does not operate according to this theory for the following reason. DC restorer circuits look for the most negative voltage, and adjust the DC level of the video signal based on this voltage under the assumption that this voltage corresponds to the blackest area in the image when in actuality the most negative voltage actually corresponds to the negative peaks of the synch pulses. Since DC restorer type AGC circuits do not discriminate between true black signals on the one hand and the negative peaks of synch pulses on the other hand, these circuits unnecessarily compress the range of the video signal by upwards of 30–40%. Use of DC restorer circuits is particularly disadvantageous whenever the video signal is fed to an analog-to-digital (A/D) converter. Here, 30–40% of the dynamic range of the converter is needlessly lost by shifting the level of the entire video signal including the synch pulses—which carry no picture information—so that the entire signal lies within the useable range of the converter.

Another type of prior art AGC circuit feeds the video signal produced by a video camera through an analog multiplier, typically a transconductance amplifier. Here, the AGC includes a detector which determines the brightest and darkest areas in the image, and adjusts the gain of the AGC, by appropriately varying the magnitude of one of the input voltages applied to the multiplier, so that the voltages corresponding to these areas never exceed a pre-selected range. Unfortunately, this type of AGC circuit is not only extremely complex and expensive, but also exhibits non-linear performance inasmuch as analog multipliers—particularly transconductance amplifiers—possess some non-linearity. Moreover, these AGC circuits require a viewer to properly adjust brightness and contrast controls in order to produce peak performance. Since few viewers know how to properly adjust these controls, such circuits often seem to produce inferior results.

In addition, video AGC circuits known to the art, which are employed in digital image processing systems, utilize the input analog voltage applied to the A/D converter as a feedback voltage to determine the proper amount of AGC gain and level change. As a result, these AGC circuits can not eliminate the small amounts of DC offset voltages that the A/D converter typically injects into its output signal.

Moreover, the background light which comprises only a portion of a scene will often change. In these situations, dependent upon where that portion is situated relative to the rest of the scene, it may not be desireable to alter the level of the video signal produced by the camera. For example, if that portion is in an area of no interest to a viewer but nonetheless becomes very bright and if the video signal is adjusted in response to this change in intensity, then the remainder of the image will become too dark and lose sufficient contrast to permit adequate viewing. Hence, any activity occurring in the area of interest will be not be readily detectable on a remote monitor. In an attempt to ameliorate this problem, some prior art AGC circuits average any changes in the light intensity over the entire scene in order to produce an average value and then adjust the video signal in response to this average value rather than in response to any isolated peak changes in the light intensity. While this well-known technique provides satisfactory results in most situations, difficulties arise where a white or light colored object is displayed against a black background. Here, after a video signal has been modified by the AGC, truly black areas tend to become too dark (i.e. too low in voltage) and are not displayed at all, and areas that are not quite as black are displayed as being black. This, in turn, causes a phenomena known as "tilt" to appear in the image wherein one portion of a supposedly black area gets darker relative to other portions of the same black area.

Thus, a need has existed in the art for an inexpensive and simple video AGC circuit, particularly suited for use in conjunction with a A/D converter. This circuit should: first, continuously modify the picture information, including its DC level, as well as change the gain of the converter, if necessary, to ensure that the picture information consumes the entire dynamic range of the converter; second, respond to light intensity changes occurring in any selected area of the scene and ignore changes occurring in other areas; and third, eliminate any offsets injected by the A/D converter.

SUMMARY OF THE INVENTION

Accordingly, it is an object of the present invention to provide a video AGC circuit which is advantageously suited for use with an A/D converter.

A particular object is to provide such a circuit which continuously modifies a video signal in order to ensure that the picture information consumes the entire dynamic range of the A/D converter.

Another particular object is to provide such a circuit which adjusts the video signal to automatically compensate for any offset introduced by the A/D converter.

A further object is to provide such an AGC circuit which, when operating on images containing sharply contrasting objects, does not display any "tilt".

An additional object is to provide such an AGC circuit which exhibits extremely linear performance and also eliminates the need for a viewer to adjust the brightness and contrast controls in order to achieve optimum performance.

An additional object is to provide such an AGC circuit which is both inexpensive and simple.

These and other objects are accomplished in accordance with the teachings of the invention by apparatus which responds to light intensity changes occurring in only a selected area of a scene and effectively ignores changes occurring in any other areas. Specifically, this apparatus comprises: an analog-to-digital converter, having a dynamic range and a certain gain and operative in response to an intermediate input signal, for producing a digital output signal having digital values representing analog picture information contained in an incoming video signal; means, connected to the converter and operative in response to the incoming video signal and to at least one feedback signal, for producing the intermediate input signal and for ensuring that picture information contained in the intermediate input signal consumes substantially all of the dynamic range of the converter; means, operative in response to the occurrence of vertical and horizontal synchronization pulses, occurring in the incoming video signal, for providing an enable signal and for selectively varying the starting time and duration of the enable signal so as to selectively define an active window, within a video image, on which the AGC is to operate; and means, responsive to the digital output signal and to the enable signal, for comparing the digital values against pre-defined minimum and maximum values and, in response thereto, generating the feedback signal.

In accordance with a feature of the invention, the active window can be located anywhere within an active image area and can encompass any area from the entire image area to that of a single picture element by suitably adjusting the starting and duration times of the enable signal.

BRIEF DESCRIPTION OF THE DRAWING

A complete understanding of the principles of the present invention may be gained by considering the following detailed description in conjunction with the accompanying drawing, in which.

DETAILED DESCRIPTION

Figure 1:
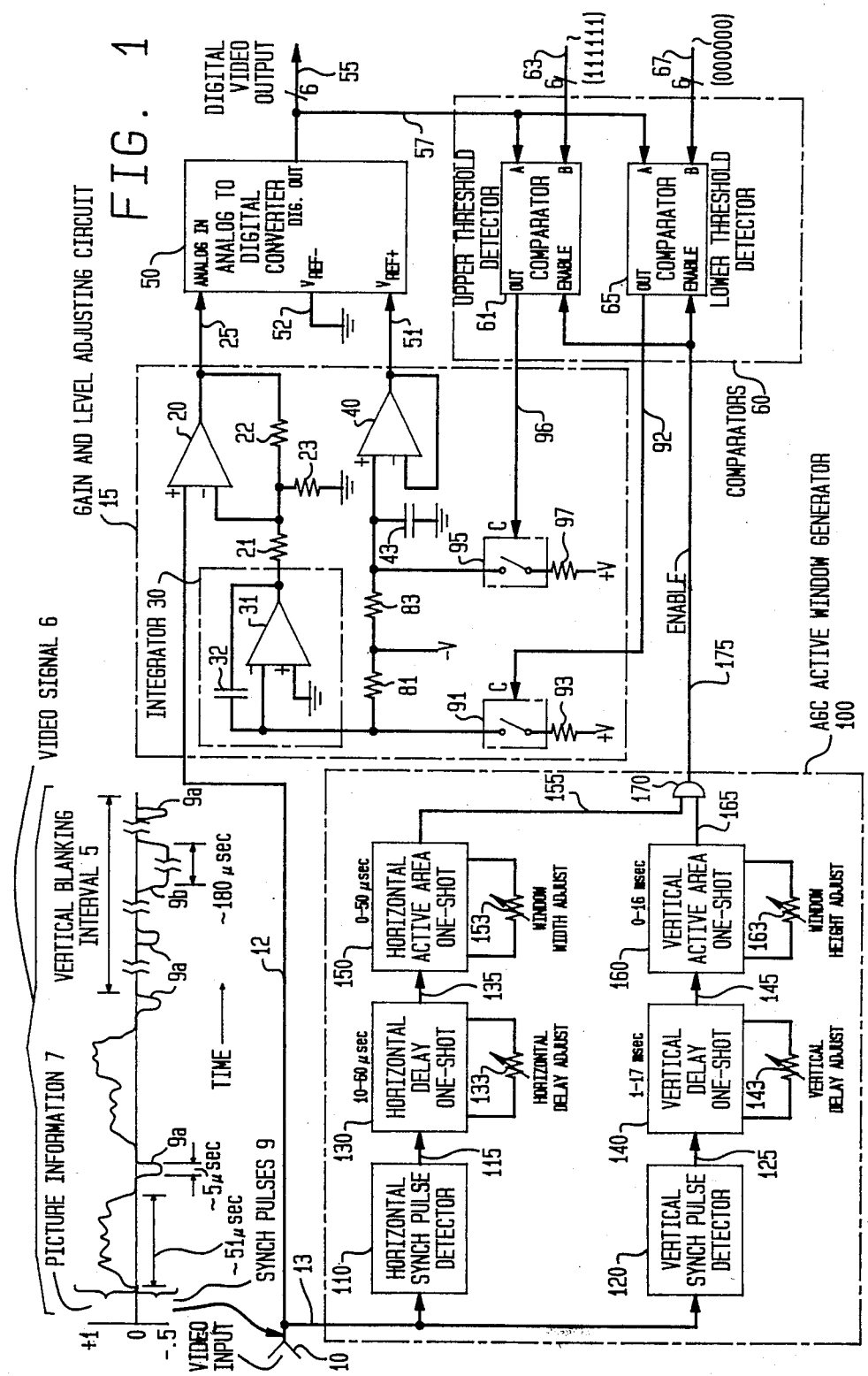
FIG. 1 depicts a block diagram of a video AGC circuit embodying the principles of the present invention.

A block diagram of a video automatic gain control (AGC) circuit constructed in accordance with the teachings of the present invention is shown in FIG. 1.

As shown, an input analog video signal 6 is applied to input 10 and, via leads 12 and 13, to gain and level adjusting circuit 15, and active window generator 100. Signal 6 is a typical analog video signal and includes synchronization pulses 9 ("synch" pulses) having a maximum peak amplitude of $-0.4$ volts. These synch pulses sandwich (analog video) picture information 7 that varies between $+1.0$ volt, for a pure white signal, to 0.0 volts or ground, for a true black signal. For black and white images, the magnitude of the picture information represents intensity changes; for color images, additional information is added into the video but this additional information does not change the maximum voltage limits. In order to simplify the ensuing discussion, this video information—whether intensity levels or color hues—and its DC level will all be collectively referred to as picture information. In signal 6, pulse 9a having a width of approximately 5 micro-seconds and occurring during vertical blanking interval 5, is the vertical synchronization pulse and, pulse 9b, having a width of approximately 180 micro-seconds, is the horizontal synchronization pulse. To conserve drawing space, the horizontal time axis is not drawn to scale.

Gain and level adjusting circuit 15 dynamically varies both the range of multiplying analog-to-digital (A/D) converter 50 as well as the DC level of the analog video signal applied thereto in response to two feedback signals appearing over leads 92 and 96. The output of circuit 15 is applied as input to A/D converter 50. The feedback signals ensure that the picture information portion of the input analog video signal has the proper DC level and consumes the entire dynamic range of the A/D converter. Comparators 60 monitor the maximum and minimum values of the digitized video signal produced by converter 50 and, in response thereto, generate the feedback signals appearing over leads 92 and 96.

AGC active window generator 100 detects the horizontal and vertical synch pulses, and, in response thereto, produces control signals which are applied over lead 175 to comparators 60. These control signals enable the operation of these comparators during a pre-selected window of time and thereby permit the AGC to be active during this time. As discussed in greater detail below, both the starting time and the duration of this window are fully adjustable. This advantageously permits the AGC to operate only on a pre-selected portion (the "active window") of a scanned video image. The active window can extend from the entire active video image, i.e. the entire displayed video image less the blanking areas, to any small area, such as that of a single picture element, located anywhere in the active image. As a result, the AGC ignores changes occurring in the remainder of the image thereby ensuring that the active window is displayed with proper brightness and contrast.

Specifically, input analog video signal 6 appearing over lead 12 is applied to the non-inverting input of amplifier 20 in circuit 15. This amplifier increases the maximum amplitude of the analog video signal to a pre-defined value, typically approximately 2 volts peak for the picture information. In addition, amplifier 20, as will become evident shortly, also shifts the DC level of the analog video signal to an appropriate level. The output of amplifier 20, also referred to as an intermediate input signal, is applied as an analog input signal to analog input 25 of A/D converter 50.

Converter 50 is a flash analog-to-digital converter which generates an illustratively 6 bit output corresponding to 64 different gray levels. The converter produces a digital signal on its parallel output leads 55 that is the digital equivalent of the intermediate input voltage with respect to the value of the positive and negative reference voltages also applied to the A/D. For example, if the intermediate input voltage applied to the A/D equals the value of the negative reference voltage which here, by virtue of the lead 52 being connected to ground, equals zero, then the A/D produces all zeroes (000000) for both zero-valued and all negative input voltages. Alternatively, if the intermediate input voltage equals the value of the positive reference voltage appearing over lead 51, then the A/D produces all ones (111111). Since the positive reference voltage applied over lead 51 determines the magnitude of the intermediate input signal which, when applied to the A/D, will produce the maximum output, the positive reference voltage in effect provides a gain control over the output of the A/D. Clearly, the lower level of the A/D converter could be set by applying a non-zero voltage over lead 52; however, the A/D converter and amplifier 20 might be forced outside their useable voltage ranges as a result. By incorporating the DC level adjustment into amplifier 20 and ahead of the A/D converter, this out-of-range problem is advantageously avoided.

The digitized video output word is applied in parallel over leads 55 to appropriate output terminals (not shown) and over leads 57 to an input of digital comparators 61 and 65. Comparator 61 serves as an upper threshold detector and provides an output signal whenever the value of the digitized video is maximum (111111). Comparator 65 serves as a lower threshold detector and provides an output signal whenever the value of the digitized video is minimum (000000). The output of both comparators, appearing over lead 96 for comparator 61 and lead 92 for comparator 65, are fed back as input to circuit 15. Maximum and minimum digital values, "111111" and "000000", are applied as input, via leads 63 and 67, to comparators 61 and 65, respectively.

If the magnitude of the picture information in the active window does not reach all ones or all zeroes, the feedback signals remain zero valued and, in response thereto, the gain of the A/D converter and DC level of the intermediate input signal are changed accordingly in order to ensure that the full dynamic range of converter 50 is used. In particular, if the DC level of the intermediate input signal applied to the A/D is too high, i.e. the digitized video does not decrease to all zeroes somewhere in the active window, then comparator 65 does not generate a pulse over lead 92. The absence of such a pulse at the control input of switch 91 causes this switch to remain open. This permits the negative voltage level, $-V$, to be applied through resistor 81 to the input of integrator 30, comprised of amplifier 31 and integrating capacitor 32. This, in turn, causes the output voltage of amplifier 31, also referred to as a first control voltage, to ramp positive. Since this output voltage is applied through resistor 21 to the negative summing junction of amplifier 20, the DC level of the intermediate input signal applied to the input of A/D 50 decreases. The time constant of integrator 30 is set by the value of capacitor 32 and resistor 81. This time constant is generally chosen to be fairly slow, typically on the order of one second, in order to prevent any "tilt" from occurring. Since, the DC level of the intermediate input signal is decreasing, eventually the magnitude of the intermediate input signal will decrease far enough to produce all zeroes at the output of the A/D. At this point, comparator 65 produces a positive pulse. When applied to the control input of switch 91, this pulse causes this switch to close thereby applying a positive voltage level, $+V$, through resistor 93 to the input of the integrator. Since the value of resistor 93 is much less than that of resistor 81, the integrator begins to ramp downward, thereby forcing the DC level of the intermediate input signal back up. The value of resistor 93 is chosen to be sufficiently large such that small negative spikes in the input analog video signal do not affect the DC level of the intermediate input signal.

Alternatively, if the DC level of the intermediate input signal applied to the A/D is too low, i.e. the digitized video does not reach all ones somewhere in the active window, then comparator 61 does not generate a pulse over lead 96. The absence of such a pulse at the control input of switch 95 causes this switch to remain open thereby permitting the negative voltage level, $-V$, to be applied through resistor 83 and across capacitor 43. This causes the voltage across this capacitor to ramp downward. Since this voltage is applied to the non-inverting input of unity gain amplifier 40, the output of this amplifier, referred to as a second control voltage, which is applied to the positive reference voltage input of the A/D converter, ramps negative. This, in turn, increases the gain of the A/D. The values of capacitor 43 and resistor 83 are appropriately chosen such that their time constant is fairly slow, typically on the order of one second. As long as digitized video remains below all ones, then capacitor 43 continues to charge negatively through resistor 83. Once the digitized output reaches all ones, comparator 61 produces a positive pulse which closes switch 95 and, in turn, applies a positive voltage through resistor 97 across capacitor 43. Since the value of resistor 97 is much less than that of resistor 83, the capacitor voltage begins to ramp upward thereby forcing the positive reference voltage of the A/D upward and the gain of the A/D converter downward. The value of resistor 97 is chosen to be sufficiently large such that small positive spikes in the input analog video signal do not affect the DC level of the second control voltage. To prevent the active window of any displayed image from becoming too noisy, particularly during low light conditions (e.g. night use), the maximum gain of the A/D converter is limited by preventing the positive reference voltage from decreasing all the way to zero. This is facilitated by limiting the negative voltage applied to the input of amplifier 40 through any one of many well-known means (not shown).

Figure 2:
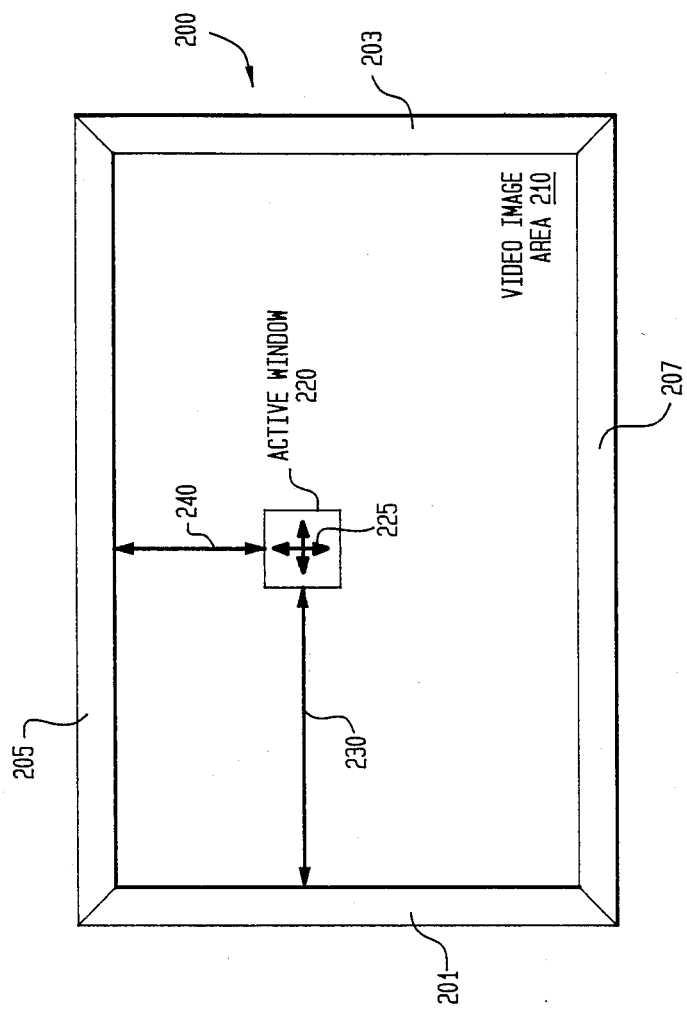
FIG. 2 depicts a video image, as displayed on a monitor, having a pre-selected portion (the "active window") on which the AGC operates in accordance with the teachings of the invention.

As will now be discussed, AGC active window generator 100 enables comparators 61 and 65 for certain periods of time such that the AGC only operates on a desired portion of the image (i.e. the active window)—and not on the remainder of the image or on the blanking areas. As previously noted, an analog video signal contains synch pulses: a fairly wide negative vertical synch pulse 9b (typically on the order of 180 micro-seconds in width) occurring once per field followed by a fairly narrow negative horizontal synch pulse 9a (typically on the order of 5 micro-seconds in width) occurring once per line. Both of these synch pulses are detected within AGC active window generator 100 by well-known horizontal and vertical synch pulse detectors 110 and 120. Each such detector produces a short pulse upon the occurrence of its respective synch pulse. The top vertical blanking area (at the top of a displayed video image) is approximately 1 milli-second in duration and the left horizontal blanking area (to the left of a displayed video image) is approximately 10 micro-seconds. Since no picture information is transmitted during either of these times, the AGC must not be active during these blanking intervals. To accomplish this, the enable signal appearing on lead 175 is delayed by a period of time at least as long as these intervals. Specifically, the output of vertical synch pulse detector 120 is applied, over lead 125, to one-shot (monostable multivibrator) 140 which produces a pulse at least 1 milli-second later than the occurrence of the vertical synch pulse. By varying the setting of potentiometer 143, the delay produced by one-shot 140 can be increased. This one-shot determines where, measured downward from the top of the image, the AGC is to become active. Hence, by suitably adjusting potentiometer 143, the AGC can be set to become active on any pre-determined horizontal scan line situated below the top vertical blanking area. The pulse produced by one-shot 140 is applied as input, via lead 145, to one-shot 160. This latter one-shot generates a pulse which determines the maximum interval of time throughout which the AGC is to be active during each displayed image. Consequently, the AGC operates on all scan lines that occur between the start and termination of the pulse produced by one-shot 160. By suitably adjusting potentiometer 163, this time interval can be varied and hence the AGC can be set to operate on any number of contiguous scan lines extending to any depth below the pre-determined scan line. In a similar fashion, cascaded one-shots 130 and 150, driven by the output of horizontal synch pulse detector 110 applied over lead 115, determine the particular portion of each of the selected contiguous horizontal scan lines during which the AGC is to operate. This portion can be set to encompass any continuous segment of a scan line. Specifically, one-shot 130 provides at least a 10 micro-second delay to inhibit the AGC from operating during at least the left horizontal blanking area. Potentiometer 133 can be suitably varied to extend this delay to inhibit the AGC from operating until any point is reached along a scan line. One-shot 150 determines the period of time during which the AGC is to be active during each selected scan line. This time period can be varied by suitably adjusting potentiometer 153. The outputs from one-shots 150 and 160 are applied over leads 155 and 165 to respective inputs of AND gate 170. The output of this gate is a pulse occurring once during each of the pre-selected contiguous horizontal scan lines which, when fed over lead 175 to the enable inputs of comparators 61 and 65, enables both comparators and hence allows the AGC to operate during only a pre-selected portion of each these scan lines. In effect, as shown in FIG. 2, a box, within which the AGC operates, is electrically defined within active video image area 210. This box is active window 220. The active video image area together with the horizontal blanking areas 201 and 203 and the vertical blanking areas 205 and 207 comprise the entire image 200 sent to a video monitor. By appropriately varying the settings of horizontal and vertical delay potentiometers 133 and 143 (see FIG. 1), the amount of horizontal spacing 230 from horizontal blanking area 201 and/or vertical spacing 240 from vertical blanking area 205 to the active window 220 can be varied accordingly. As such, the active window can be located anywhere within the video image area. The width and height of the active window can be separately varied by appropriately adjusting window width and height adjust potentiometers 153 and 163 to change the dimensions of the window, in the directions shown by arrows 225, in order to encompass any area from that a single picture element (pixel) to that of the entire picture.

As is now evident, the inventive video AGC and digitizing circuit described above continuously, simultaneously and independently adjusts both the gain of the A/D converter and the DC level of the analog video signal (specifically, that of the picture information) applied to the A/D converter in order to utilize the full dynamic range of the converter and hence produce a proper image of the active window under all input signal conditions—regardless of whether the active window is set to be the entire video image or any pre-selected portion thereof.

Clearly, those skilled in the art can readily appreciate that the active window adjustments (both delay, and width and height) can be achieved not only by using potentiometers, but also by applying suitable control voltages, to well-known circuitry in order to vary the time-periods of the respective one-shots. These control voltages can advantageously be produced by other circuitry so as to automatically choose the proper position and size for the active window. For example, the digitized video output can be routed to a motion detector which performs a frame-by-frame comparison to detect any motion occurring anywhere within the scanned image. If any motion is detected, then the detector, or other circuitry such as a computer, could generate suitable control voltages to automatically locate the active window over the portion of the image in which the motion has occurred in order to ensure that at least that portion is displayed with proper brightness and contrast. Furthermore, the shape of the active window can be changed from rectangular to any other shape, such as circular, by suitably changing the time at which the pulses produced by the active window generator occur and their duration. Moreover, the horizontal scan lines comprising the active window need not be contiguous. In fact, the active window can be readily set to encompass any number of isolated portions of the image area.

Although a single embodiment of the present invention is shown and discussed above, many other embodiments may be made by those skilled in the art without departing from the spirit and scope of the invention.

I claim:

1. A circuit, having an automatic gain control (AGC), for providing a digital output signal having digital values representing analog picture information in an incoming video signal, said incoming video signal also having vertical and horizontal synchronization pulses, said circuit comprising:

an analog-to-digital converter, having a dynamic range and a certain gain and operative in response to an analog input signal, for producing the digital output signal, means, connected to said converter and operative in response to said incoming video signal and to at least one feedback signal, for producing the analog input signal and for ensuring that picture information contained in said analog input signal consumes substantially all of the dynamic range of the converter, means, operative in response to the occurrence of said synchronization pulses for providing an enable signal and for selectively varying the starting time and duration of the enable signal so as to selectively define an active window, within a video image, on which the AGC is to operate; and means, responsive to said digital output signal and to the enable signal, for comparing the digital values against pre-defined minimum and maximum values and, in response thereto, generating said feedback signal.

2. The circuit in claim 1 wherein providing and varying means further comprises means for varying the shape and location of the active window.

3. The circuit in claim 2 wherein the providing and varying means further comprises means for selecting at least one group of horizontal scan lines comprising said image and means for selecting a portion of each scan line in said group on which the AGC is to operate.

4. The circuit in claim 3 wherein the providing and varying means further comprises means for delaying the operation of the AGC on each scan line in said group for a pre-selected period of time and means for enabling the operation of the AGC during each selected portion of said each scan line.

5. The circuit in claim 4 wherein the providing and varying means further comprises:

first means for detecting each of said horizontal synchronization pulses, second means for detecting each of said vertical synchronization pulses, first delay means for providing a first pulse which is delayed by a pre-determined first interval of time after the occurrence of each of said horizontal synchronization pulses, second delay means for providing a second pulse which is delayed by a pre-determined second interval of time after the occurrence of each of said vertical synchronization pulses, first timing means for providing a third pulse, in reponse to the occurrence of said first pulse, lasting for a third pre-determined interval of time and which determines the pre-selected portion of said each scan line, second timing means for providing a fourth pulse, in reponse to the occurrence of said second pulse, lasting for a fourth pre-determined interval of time and which determines the number of scan lines in said group, and means for gating said third and fourth pulses to produce said enable signal.

6. The circuit in claim 5 wherein at least one of said pre-determined intervals of time is adjustable.

7. The circuit in claim 6 wherein the duration of the first and second pre-determined time intervals are substantially equal to the duration of horizontal and vertical blanking areas, respectively, in a displayed image.

8. The circuit in claim 1 wherein the producing and ensuring means comprises: means, responsive to respective ones of said feedback signals, for adjusting a DC level of said picture information in order to produce said analog input signal and for adjusting the gain of the converter, whereby the picture information contained in said analog input signal consumes substantially all of the dynamic range of the converter.

9. The circuit in claim 8 wherein the producing and ensuring means further comprises:

means, responsive to said incoming video signal, for adding a DC voltage thereto so as to vary the DC level of said incoming video signal, means for providing a first control voltage which linearly changes in a particular direction, and applying said first control voltage as said DC voltage, and means for altering the direction in response to the occurence of a pulse on a first one of the feedback signals.

10. The circuit in claim 9 wherein the producing and ensuring means further comprises:

means for integrating a first reference voltage at a first pre-determined time constant and for integrating a second reference voltage at a second pre-determined time constant in order to generate said first control voltage, wherein the first time constant is larger than the second time constant.

11. The circuit in claim 10 wherein the producing and ensuring means further comprises:

an integrator wherein said first reference voltage is applied through a first resistor as an input to the integrator, and a switch for selectively applying said second reference voltage, through a second resistor, as an input to the integrator in response to the pulse in the first one of the feedback signals.

12. The circuit in claim 8 wherein the producing and ensuring means further comprises:

means for providing a second control voltage which linearly changes in a particular direction, and applying said second control voltage as a positive input reference voltage to said converter so as to vary the gain of the converter, and means for altering the direction of said second control voltage in response to the occurence of a respective pulse on a second one of the feedback signals.

13. The circuit in claim 12 wherein the producing and ensuring means further comprises:

means for integrating a third reference voltage at a third pre-determined time constant and for integrating a fourth reference voltage at a fourth pre-determined time constant in order to generate said second control voltage, wherein the third time constant is larger than the fourth time constant.

14. The circuit in claim 13 wherein the producing and ensuring means further comprises:

a second integrator wherein said third reference voltage is applied through a third resistor as an input to the second integrator, and a switch for selectively applying said fourth reference voltage, through a fourth resistor, as an input to the second integrator in response to the pulse in the second one of said feedback signals.

15. The circuit in claim 14 further comprising means for limiting the third voltage from decreasing below a pre-defined minimum value.

16. The circuit in claim 1 wherein the comparing and generating means comprises:

means for comparing the digital values against the pre-defined maximum value and generating a pulse in said first feedback signal whenever any of said digital values is greater than or equal to said maximum value, and means for comparing the digital values against the pre-defined minimum value and generating a pulse in said second feedback signal whenever any of said digital values is less than or equal to said minimum value.

* * * * *